United States Patent
Raghavendra et al.

(10) Patent No.: US 11,010,384 B2
(45) Date of Patent: May 18, 2021

(54) IMPUTING DATA FOR TEMPORAL DATA STORE JOINS

(71) Applicant: International Business Machines Corporation, Armonk, NY (US)

(72) Inventors: Ramya Raghavendra, New York, NY (US); Joshua M. Rosenkranz, White Plains, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/558,418

(22) Filed: Sep. 3, 2019

(65) Prior Publication Data
US 2019/0384768 A1    Dec. 19, 2019

Related U.S. Application Data

(63) Continuation of application No. 15/413,700, filed on Jan. 24, 2017, now Pat. No. 10,409,813.

(51) Int. Cl.
| G06F 16/2453 | (2019.01) |
| G06N 5/04 | (2006.01) |
| G06F 16/242 | (2019.01) |
| G06F 16/901 | (2019.01) |
| G06F 16/2455 | (2019.01) |
| G06F 16/2458 | (2019.01) |
| G06N 5/02 | (2006.01) |

(52) U.S. Cl.
CPC .... *G06F 16/24544* (2019.01); *G06F 16/2448* (2019.01); *G06F 16/2456* (2019.01); *G06F 16/2477* (2019.01); *G06F 16/9024* (2019.01); *G06N 5/04* (2013.01); *G06N 5/022* (2013.01)

(58) Field of Classification Search
None
See application file for complete search history.

(56) References Cited

U.S. PATENT DOCUMENTS

| 9,363,557 B2 | 6/2016 | Morales |
| 10,031,943 B1 | 7/2018 | Raghavendra |

(Continued)

OTHER PUBLICATIONS

Finlayson, Bruce A.; "Interpolation with Spline Functions," Numerical Methods for Chemical Engineeers, published May 15, 2013, retrieved Mar. 2, 2018 via WayBack Machine at https://web.archive.org/web/20130515235821/http://faculty.washington.edu/finlayso/ebook/interp/spline.htm (Year: 2013).*

(Continued)

*Primary Examiner* — Tony Mahmoudi
*Assistant Examiner* — Umar Mian
(74) *Attorney, Agent, or Firm* — Grant M. McNeilly

(57) ABSTRACT

A request may be received to join one or more attributes of at least two independent sets of data into a data structure. The one or more attributes may include a time attribute. The two independent sets of data may be included within a data store. It may be determined that there are one or more null values associated with the join to the data structure. In response to at least the determining that there are one or more null values associated with the join, one or more values may be imputed into one or more fields corresponding to the one or more null values, wherein there are no null values in the one or more fields subsequent to the imputing.

17 Claims, 6 Drawing Sheets

(56) References Cited

U.S. PATENT DOCUMENTS

| | | | |
|---|---|---|---|
| 2003/0149603 A1* | 8/2003 | Ferguson | G06Q 30/06 705/64 |
| 2006/0106797 A1* | 5/2006 | Srinivasa | G06F 16/2465 |
| 2011/0218978 A1 | 9/2011 | Hong | |
| 2012/0110042 A1* | 5/2012 | Barsness | G06F 16/21 707/825 |
| 2013/0036082 A1 | 2/2013 | Natarajan | |
| 2013/0197924 A1 | 8/2013 | Kocis | |
| 2014/0172914 A1* | 6/2014 | Elnikety | G06F 16/9024 707/774 |
| 2014/0214762 A1* | 7/2014 | Haas | G06F 16/27 707/625 |
| 2015/0186466 A1* | 7/2015 | Gaza | G06F 16/24544 707/714 |
| 2016/0078103 A1 | 3/2016 | Novik | |
| 2017/0011098 A1* | 1/2017 | Tsirulnik | G06F 16/221 |
| 2017/0060944 A1 | 3/2017 | Khayyat | |
| 2017/0193371 A1 | 7/2017 | Shen | |
| 2018/0210917 A1 | 7/2018 | Raghavendra | |

OTHER PUBLICATIONS

"Join (SQL)," Wikipedia, the free encyclopedia, Printed Dec. 5, 2016, 12 pages. https://en.wikipedia.org/wiki/Join_%28SQL%29.

"What is a SQL join?" SQL Joins Explained, http://www.sql-join.com/, printed Jan. 12, 2017, 4 pages.

Finlayson, Bruce A.; "Interpolation with Spline Functions," published online on May 15, 2013, retrieved on Mar. 2, 2018 from the Internet Archive WayBack Machine from https://web.archive.org/web/20130515235821/http://faculty.washington.edu/finlayso/ebook/interp/spline.htm (Year: 2013), 5 pages.

Gao et al., "Join operations in temporal databases," VLDB Journal, Mar. 2005, vol. 14, Issue 1, pp. 2-29. DOI: 10.1007/s00778-003-0111-3.

List of IBM Patents or Patent Applications Treated as Related, Signed Sep. 3, 2019, 2 pages.

Liu, Y., "3.5 Spline Interpolation," Lecture on Chapter 3 (Interpoation) of the 3rd year Numerical Analysis course MT3805, University of St. Andrews, 2011, pp. 1-8, www.geos.ed.ac.uk/~yliu23/docs/lect_spline.pdf, (last updated Aug. 20, 2015).

Zhao, W., "Huohua 火花 Distributed Time Series Analysis Framework for Spark," Spark Summit 2016, Two Sigma, Jun. 10, 2016, 48 pages, www.twosigma.com.

* cited by examiner

IMPUTING DATA FOR TEMPORAL DATA STORE JOINS

BACKGROUND

This disclosure relates generally to data management systems, and more specifically, to performing temporal join operations to process a data store query.

Database joins are arguably the most important relational operators because efficient join processing may be expensive to compute, but are essential for the overall efficiency of a query processor. A join operation combines one or more attributes (e.g., columns) of data from one or more data structures (e.g., tables) in a data store. Consequently, join operations allow a user to analyze independent or different sets of data at one time or in a single view. For example, in a relational database, a user may issue a Structured Query Language (SQL) query that performs an "inner join" between two tables to join the two tables' matching data. In this example, an inner join selects each record from both tables where the join condition is met. That is, each record of the combined table has corresponding values such there are no null data values. In temporal data stores, join operations involving time carry great significance. A temporal data store refers to any data store where some form of time is an attribute that is included in one or more data structures of the data store.

SUMMARY

One or more embodiments are directed to a computer-implemented method, a system, and a computer program product for performing a join operation in a data store. A first set of values may be received. The first set of values may be sampled at a first time series interval. The first set of values may be populated into a first data structure. A second set of values may be received. The second set of values may be sampled at a second time series interval. The second set of values may be populated into a second data structure. A join request may be received to join one or more attributes of the first data structure and one or more attributes of the second data structure. The request may include combining the one or more attributes of the second data structure with the first time interval. It may be determined that there are one or more null results associated with the request. A prediction estimate of what set of values would be represented by the one or more null results had the one or more attributes of the second data structure been sampled at the first time interval may be generated in response to the determining.

Figure 1:
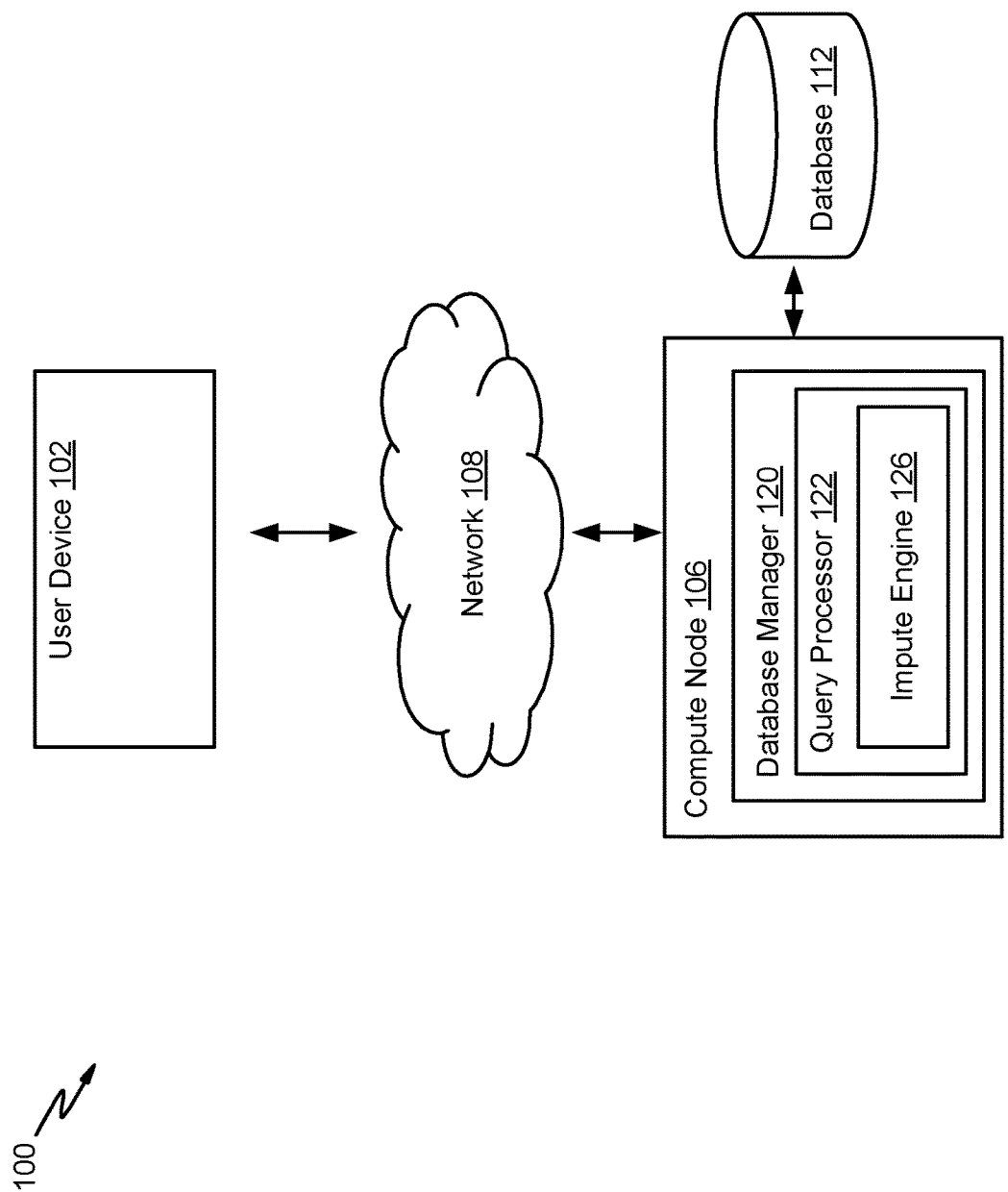
FIG. 1 is a block diagram of a computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to performing particular join operations to process a query, such as in a temporal relational database, graph database, and/or a data stream management system. While the present disclosure is not necessarily limited to such applications, various aspects of the disclosure may be appreciated through a discussion of various examples using this context.

Time is relevant in most real-world phenomena. For example, it may be important to determine how long an employee worked under a particular title at work. Temporal data stores may thus specify each time interval an employee worked under a particular title. Any form of time may be measured. For example, temporal databases may include valid time, transaction time, and/or bitemporal data. Valid time is the time at which some fact becomes true or changes in the real world (e.g., the time at which an employee gets promoted). Transaction time refers to the update operation (e.g., a DELETE, INSERT, etc.) time in the database itself, as opposed to the real world. Bitemporal data combines both transaction time and valid time. A "temporal join" refers to combining one or more time-related attributes of data from one or more data structures in a data store. A "data structure" may refer to any logical object or format for organizing and/or storing data. For example, a data structure may be or include a table, node (e.g., a graph node of a graph database), column, array, file, record, and/or hash table.

Performing temporal joins in temporal data stores may be problematic where data is only sampled or obtained at particular time intervals (as opposed to continuously), or different sets of data are sampled at different time intervals. These problems may arise in applications involving correlation analysis, forecasting, real-time sensor analysis, etc. In an illustrative example, a first sensor (e.g., a pulse oximeter) may measure data every 1 minute and its values may be transmitted from the first sensor to a database. However, a second sensor may measure a second set of data (e.g., the outside temperature) every 5 minutes and transmit the data to the same database. However, a user may desire to join data associated with these unaligned time series values. But if the user, for example, requests a join (e.g., a left join) to view all the values associated with the time stamp of the first sensor (i.e., data accumulated every one minute) with values associated with the time stamp of the second set of data (i.e., data accumulated every five minutes), there may be various null results returned in the query because measurement of both sets of data occurred at different points in time. The problem with this is that even if data is not measured at all points in time (i.e., there are missing or null values), it does not follow that the data did not itself exist at those points in time where the data was not measured. Accordingly, various embodiments of the present disclosure populate values that would otherwise be null, with predictive values using one or more algorithms (e.g., interpolation, last known value, etc.), as described in more detail below.

FIG. 1 is a block diagram of a computing environment 100, according to embodiments. The computing environment 100 may include one or more compute nodes, such as compute nodes 106, which is communicatively coupled to the user device 102 via the network 108. In some embodiments, the computing environment 100 may be implemented within a cloud computing environment, or use one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 108.

Figure 6:
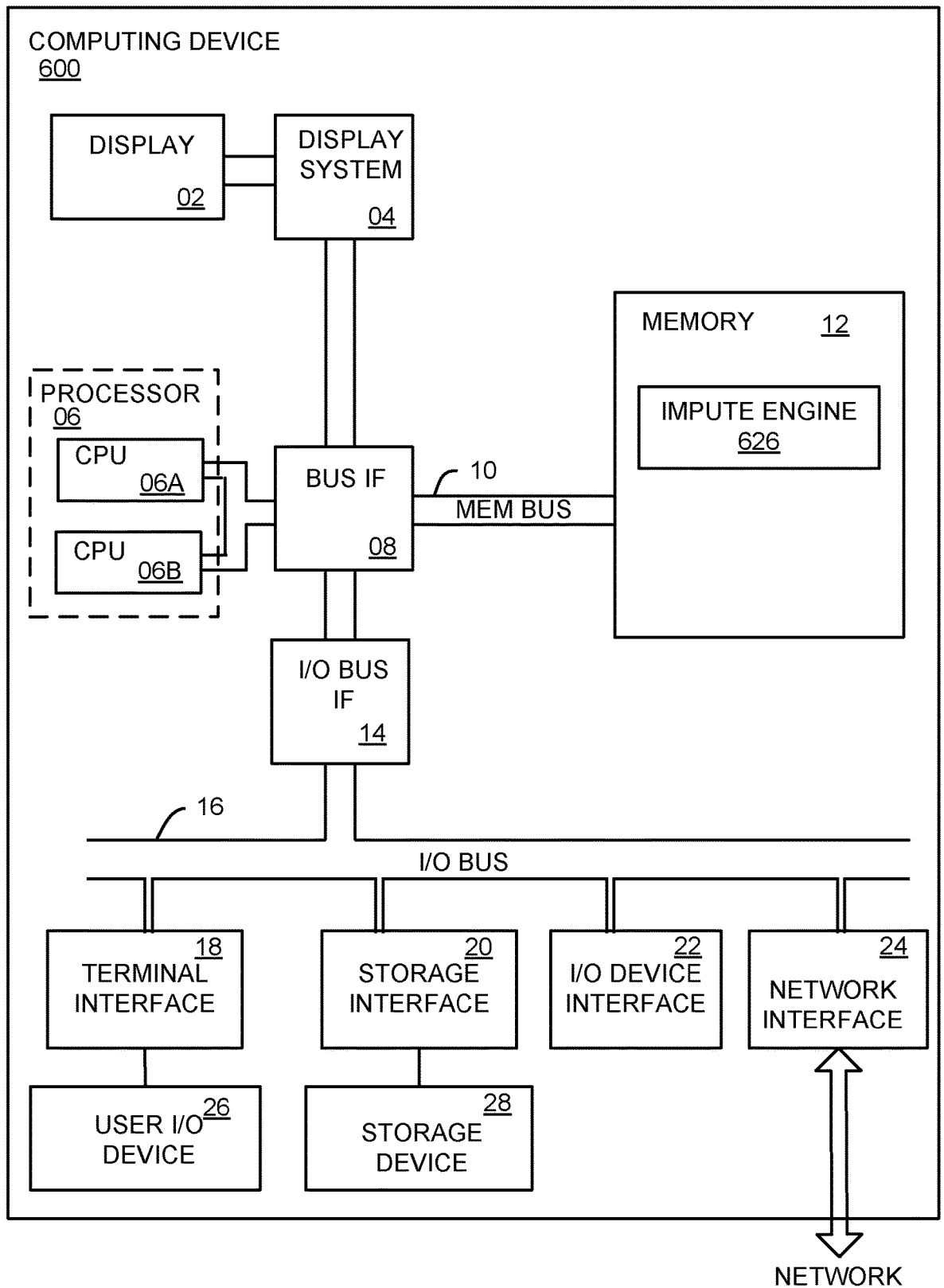
FIG. 6 is a block diagram of a computing device that includes a impute engine, according to embodiments.

Consistent with some embodiments, the compute node 106 and/or the user device 102 may be configured the same or analogous to the computing device 600, as illustrated in FIG. 6. In some computing environments, more or fewer components (e.g., compute nodes) may be present than illustrated in FIG. 1. In various embodiments, the compute node 106 represents a server computing device(s) and/or a particular compute instance of a single computing device (e.g., computing components within a chassis, a blade server within a blade enclosure, an I/O drawer, a processor chip, etc.). The user device 102 may be any suitable device that transmits data to the compute node 106. For example, the user device 102 may be or include a sensor(s), a desktop, laptop, handheld device (e.g., a mobile phone), etc.

The user device 102 may communicate with the compute node 106 via any suitable network 108. For example, the network 108 may be a local area network (LAN), a general wide area network (WAN), and/or a public network (e.g., the Internet).

In various embodiments, the database 112 is any suitable database type. For example, the database 112 may be or include relational databases, multidimensional or online analytical procession (OLAP) databases, online transactional processing databases (OLTP), graph databases, real-time databases, column-oriented databases, database warehouses, operational databases, or any other suitable data store type. In some embodiments, instead of the database 112, a data stream management system may be implemented within the computing environment 100. Any one of these databases and/or data stream management system may be considered temporal data stores for purposes of this disclosure if and only if they include a time-related attribute(s).

FIG. 1 illustrates how temporal joints may be performed in the computing environment 100. For example, a user may propose a query on the user device 102. The query may be transmitted to the compute node 106 via the network 108. The database manager 120 and specifically the query processor 122 may receive and run the query. The query processor 122 may perform various steps to process the query such as optimize the query in order to choose the most efficient query execution plan (or simply choose a plan) and execute the chosen plan. The optimizer (not shown) may include the impute engine 126, which may impute data for temporal joins within the database 112, as described in more detail below.

Stream-based computing and stream-based database computing are emerging as a developing technology for a variety of applications. For example, products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple (further defined herein) by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using some inter-process communication techniques. Further, processing elements can be inserted or removed dynamically from an operator graph representing the flow of data through the stream computing application. A particular stream operator may not reside within the same operating system process as other stream operators. Stream operators in the same operator graph may be hosted on different nodes, e.g., on different compute nodes or on different cores of a compute node.

Data flows from one stream operator to another in the form of a "tuple." A tuple is a sequence or row of one or more attribute values associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may process a received tuple within fractions of a second. Unless the stream operators are located in the same processing element, an inter-process communication path can be used each time a tuple is sent from one stream operator to another. Inter-process communication paths can be a resource in a stream computing application.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

Figure 2:
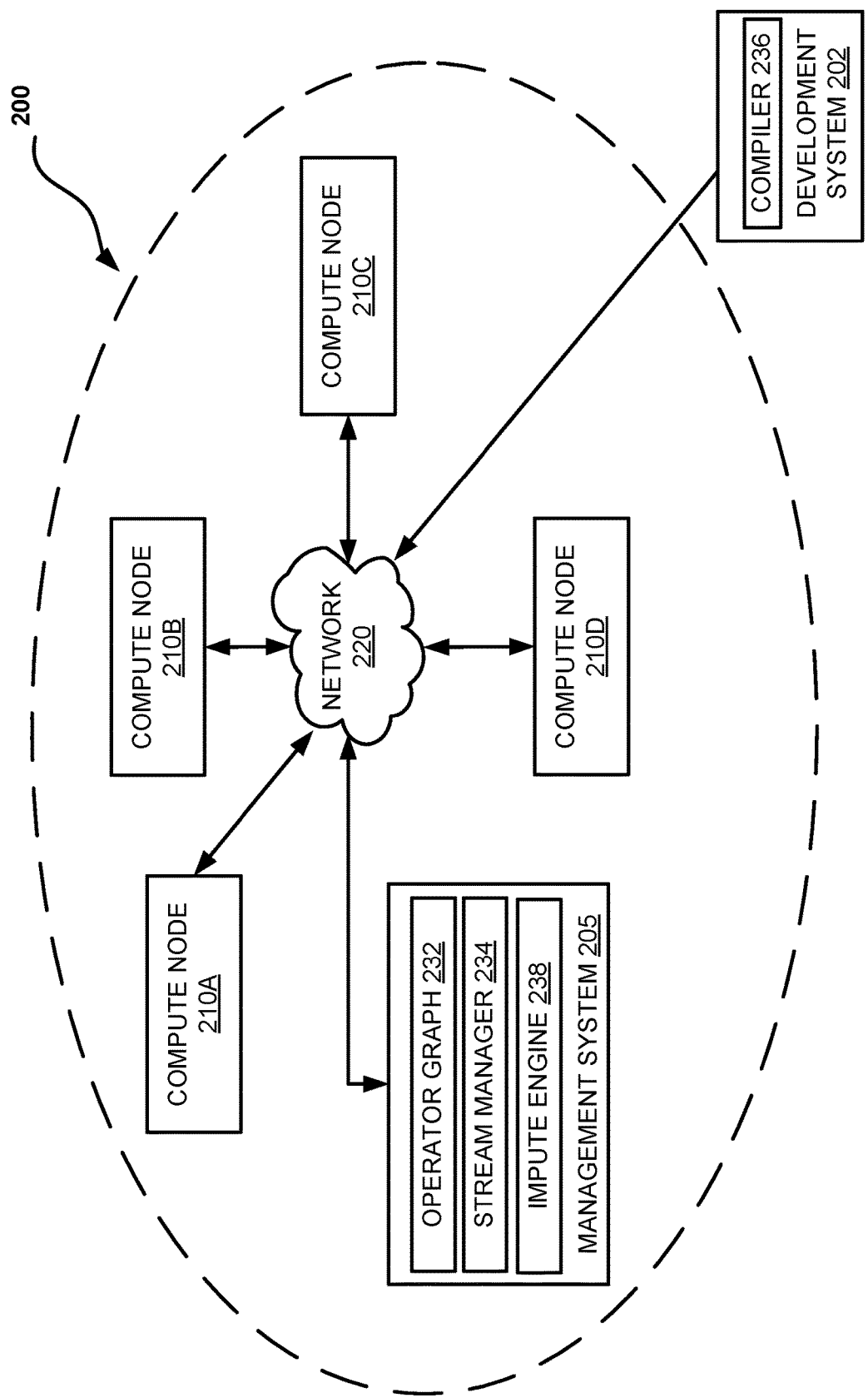
FIG. 2 illustrates a stream computing infrastructure that may be configured to execute a stream computing application, according to embodiments.

FIG. 2 illustrates a stream computing infrastructure 200 that may be configured to execute a stream computing application, according to embodiments. The stream computing infrastructure 200 includes a management system 205 and two or more compute nodes 210A-210D—i.e., hosts—which are communicatively coupled to each other using one or more communications networks 220. The management system 205 can include an operator graph 232, a stream manager 234, and a impute engine 238. The communications network 220 may include one or more servers, networks, or databases, and may use a particular communication protocol to transfer data between the compute nodes 210A-210D. A development system 202 may be communicatively coupled with the management system 205 and the compute nodes 210 either directly or via the communications network 220. In some embodiments, the stream computing infrastructure 200 is an entirely server-side environment for processing and analyzing tuples (e.g., a data stream management system). Therefore, for example, user devices (e.g., mobile phones) in some embodiments may not affect or perform any of the processes as described herein. Accordingly, two or more operators that are processing tuples may be included within the same server system and not within any client devices.

The communications network 220 may include a variety of types of physical communication channels or "links." The links may be wired, wireless, optical, or any other suitable media. In addition, the communications network 220 may include a variety of network hardware and software for performing routing, switching, and other functions, such as routers, switches, or bridges. The communications network 220 may be dedicated for use by a stream computing application or shared with other applications and users. The communications network 220 may be any size. For example, the communications network 220 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Any of the compute nodes 210 may be configured the same as or analogous to the compute node 106 and/or or the computing device 600 as illustrated in FIG. 6. The compute nodes 210 may include one or more stream operators. A stream computing application may include one or more stream operators that may be compiled into a "processing element" container. Two or more processing elements may run on the same memory, each processing element having one or more stream operators. Each stream operator may include a portion of code that processes tuples flowing into a processing element and outputs tuples to other stream operators in the same processing element, in other processing elements, or in both the same and other processing elements in a stream computing application. Processing elements may pass tuples to other processing elements that are on the same compute node 110 or on other compute nodes that are accessible via communications network 120. For example, a processing element on compute node 110A may output tuples to a processing element on compute node 110B.

The tuple received by a particular processing element is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

The management system 205 may be configured the same as or analogous to the compute nodes 106, 210, and/or the computing device 600. The management system may include the operator graph 232, the stream manager 234, and the impute engine 238. The operator graph 232 may define how tuples are routed to processing elements for processing. Because a processing element may be a collection of fused stream operators, it is equally correct to describe the operator graph 232 as one or more execution paths between specific stream operators, which may include execution paths to different stream operators within the same processing element.

An illustrative operator graph 232 for a stream computing application may begin from one or more sources through to one or more sinks, according to some embodiments. This flow from source to sink may also be generally referred to herein as an execution path. In addition, a flow from one processing element to another may be referred to as an execution path in various contexts. The operator graph 232 may include data flows between stream operators within the same or different processing elements. Typically, processing elements receive tuples from the stream as well as output tuples into the stream (except for a sink—where the stream terminates, or a source—where the stream begins). While the operator graph 232 includes a relatively small number of components, an operator graph may be much more complex and may include many individual operator graphs that may be statically or dynamically linked together.

The stream manager 234 of FIG. 2 may be configured to monitor a stream computing application running on compute nodes, e.g., compute nodes 210A-210D, change the deployment of an operator graph, e.g., operator graph 232. The stream manager 234 may move processing elements from one compute node 110 to another, for example, to manage the processing loads of the compute nodes 210A-210D in the stream computing infrastructure 200. Further, stream manager 234 may control the stream computing application by inserting, removing, fusing, un-fusing, or otherwise modifying the processing elements and stream operators (or what tuples flow to the processing elements) on the compute nodes 210A-210D.

In embodiments, the impute engine 238 imputes values in response to or as a part of stream joins. Stream joins relate or link information from different streams. For example, a first stream of tuples may flow from compute node 210D to 210C and a second stream of tuples may flow from compute node 210A to compute node 210B. The impute engine 238 may join the first and second streams of data for user analysis, such as correlation analysis, pattern identification, etc. In some embodiments, the impute engine 238 is included in the stream manager 234. In an illustrative example, a first stream of tuples may be received to be processed by a plurality of processing elements operating on one or more computer processors, each processing element may have one or more stream operators. The plurality of processing elements may form an operator graph in which the tuples flow between the one or more stream operators. The operator graph may define one or more execution paths for processing and routing the stream of tuples. Each processing element may have an associated memory space. A second set of tuples may also be received. A request may be received to join the first stream with the second stream. The first stream may be sampled at a first time series interval. The second stream may be sampled at a second time series interval. It may be determined that there are one or more null results associated with the request. In response to the determining, a prediction estimate may be generated of what set of values would be represented by the one or more null results had the first stream been sampled at the second time series interval. The prediction estimate is described in more detail below.

Streams may be joined in any suitable manner, such as count-based joining (e.g., joining every $N^{th}$ tuple), attribute-based (joining attributes X,Y from different streams), and window-based (e.g., joining particular tuples at X timestamp boundaries). The functions of the impute engine 238 are described in more detail below, such as in FIG. 5.

Figure 3:
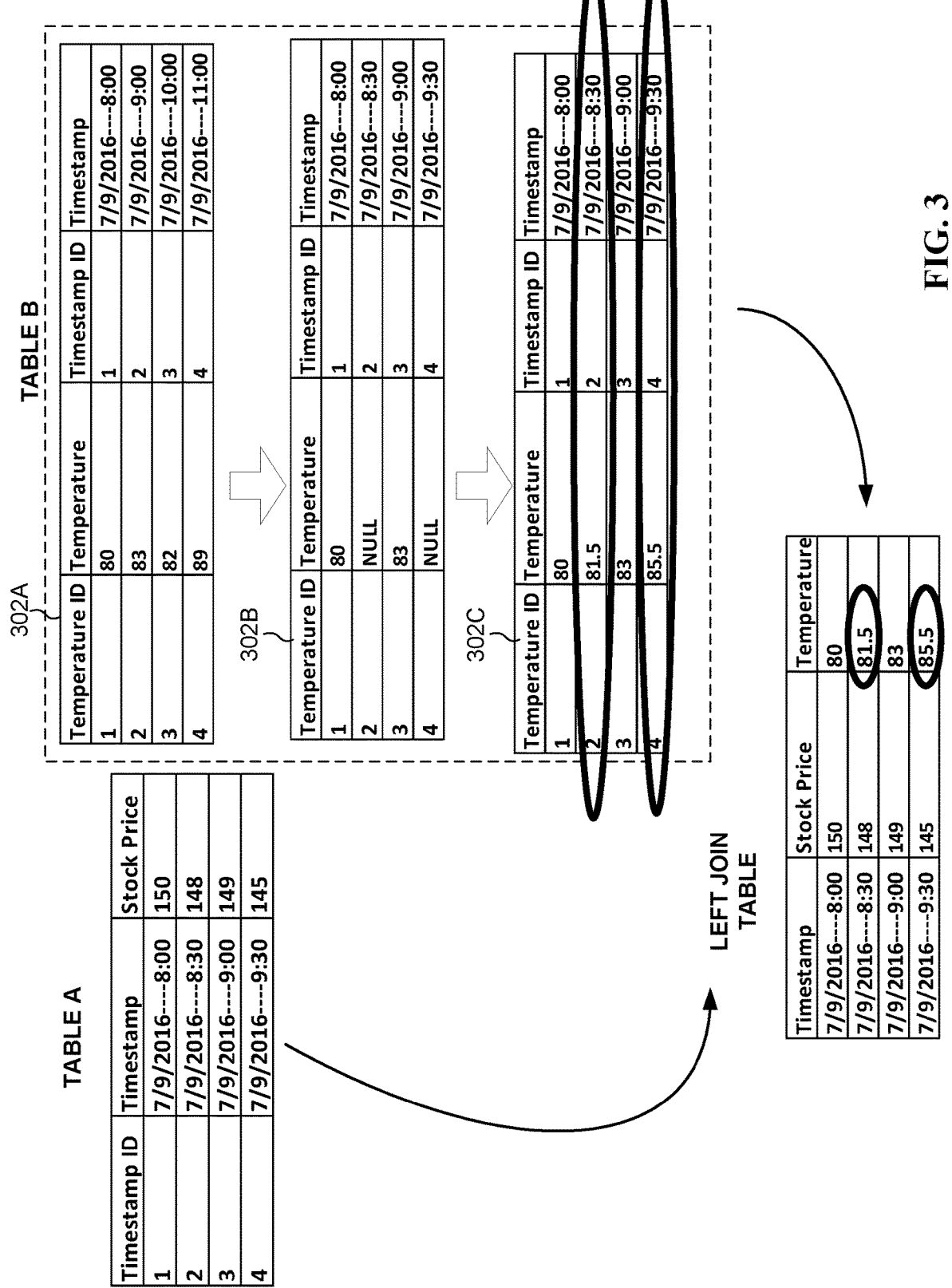
FIG. 3 is relational database table diagram of a temporal left join operation, according to embodiments.

FIG. 3 is relational database table diagram of a temporal left join operation, according to embodiments. Tables A and B (e.g., 302A) may be data structures that hold discrete sets of data in a relational database file. Table A may represent a unique set of data that is sampled or populated at a different time interval when compared to Table B. Table A includes three columns—the "timestamp ID" column (which is the primary key of table A), the timestamp column, and the stock price column. There are four records or rows corresponding to timestamp ID 1-4. The "timestamp" column indicates the date and clock time data was sampled or populated in the corresponding table. For example, for timestamp ID 1, on Jul. 9, 2016 at 8:00, the stock price was 150. It is understood by one of ordinary skill in the art that Table A and B are illustrative or representative only. Accordingly, for example, there may be more or fewer records and different columns, etc. Table A illustrates that the stock price is sampled, obtained, or populated every 30 minutes starting at 8:00 until 9:30.

Table B includes four columns—a "temperature ID" column (which is the primary key of table B), a "temperature" column, a "timestamp ID" column (which is the foreign key in table B), and a "timestamp" column. FIG. 3 illustrates three different states of Table B at three different times (302A, 302B, and 302C), in accordance with a left join table request. Table 302A may represent the earliest time period. Table 302B may represent an intermediate time period. And table 302C may represent table B at a latest time period. For example at a first time, table 302A may represent data as it appears before a left join request. Therefore, before a left join request, the temperature may be sampled at every hour starting from 8:00 until 11:00, and temperature values may be sampled accordingly. For example, a temperature sensor may be located in an environment and may be configured to measure the ambient temperature of the environment every hour. The sensor may be coupled to a radio such that it may transmit the temperature measurement value to a database that includes the table B, whereby a database management system may populate table B with the corresponding values accordingly. Thus, for example, on Jul. 9, 2016 at 8:00, the temperature may be sampled at 80 degrees and populated in table 302A accordingly.

At a second time, a request to perform a left join of table A and table B in its 302A state may be issued. A left join selects each and every record from table A, along with records of table B for which a join condition is met (if at all), including any null results. For example, a user may issue a SQL left join query request, such as:

SELECT: *
FROM: Table A
LEFT JOIN: Table B
ON: Table A timestamp=Table B timestamp
WHERE: results are null.

Accordingly, each attribute of table A may be selected—timestamp, and stock price—and left joined with table B's temperature data and equi-joined at the same timestamp interval as table A where the results are NULL in table 302B. As disclosed herein the term, "null," "null field," "null record," or "null results" indicates that value(s) are absent/missing/unknown/do not exist compared to values for the same attribute. Therefore, subsequent to the left join request, table B may be populated or organized according to the table 302B. Because data is sampled in table B at every hour and not every half hour such as in table A, there are two NULL fields/records for the second and fourth record of the "temperature" column in table 302B. Accordingly, at 8:30 it is unknown what the temperature is because the temperature was not sampled or populated at that time. Likewise, at 9:30 it is unknown what the temperature is because the temperature was not sampled or populated at that time.

At a third subsequent time, the NULL results (e.g., fields/records) may be imputed with values according to table 302C. To "impute" may refer to inserting value(s) to stand in for missing or null data. Table 302C indicates that for the timestamp of 8:30, the temperature may be inferred to be 81.5 and this value may be imputed accordingly. And at 9:30, the temperature may be inferred to be 85.5 and imputed accordingly. The various algorithms and techniques for estimating and imputing values are described in more detail below.

At a fourth subsequent time, the "left join table" may be presented or displayed to a user as the completion of the left join request. Accordingly, the database manager may perform a left join operation of table A and the 302B version of table B to arrive at the "left join table." Therefore, for every half hour time series interval sampling—8:00, 8:30, 9:00, 9:30—according to table A, readings for both the stock price and temperature may be populated in the left join table. The imputed values of 81.5 and 85.5 may be included in the left join table. This is different than typical left join operations, which may present the left join table with the null values still indicated. However, just because data is missing or null, does not mean that it does not or should not exist. Data may be advantageously imputed for various data analyses, such as mean, median, variance, standard deviation, etc. across an entire time series spectrum to obtain more accurate analyses. For example, the variance of the temperature values may be computed for each of the half hour time intervals to initiate more complex analyses of the data.

Figure 4A:
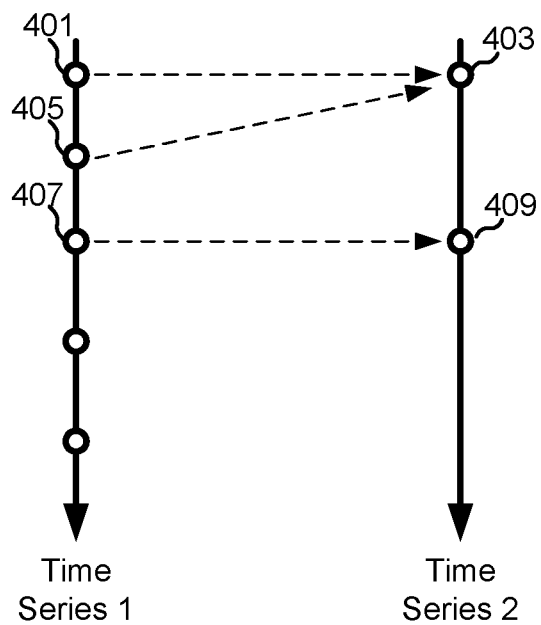
FIG. 4A is a time series diagram illustrating how data may be estimated and imputed, according to embodiments.

FIG. 4A is a time series diagram illustrating how data may be estimated and imputed, according to embodiments. FIG. 4A illustrates that data may be imputed according to last-known-value methods. Time series 1 represents a first time interval of a first data structure and time series 2 represents a different time interval of a second data structure. Points 401, 403, 405, 407, and 409 all represent different points in time (e.g., timestamps) along the time series'. As illustrated in FIG. 3 above, in some instances, time may be measured at different intervals for data included in the same data store. In order to align the data corresponding to different time series, various estimation and imputation methods may be performed.

According to FIG. 4A, if there are null results for data obtained at a particular interval, the last value corresponding to an earlier time series may be imputed in the null field. In an illustrative example, time series 1 may represent that data is sampled every half hour. Point 401 may represent 8:00, points 405 may represent 8:30, and point 407 may represent 9:00. Time series 2 may represent that data is sampled every hour (as opposed every half hour). Point 403 may represent 8:00, and point 409 may represent 9:00. Upon a join request associated with the two different time series, data may be imputed for point 405 (8:30) since this point does not exist for the time series 2 interval. The imputation method may insert values measured or populated at the points 401 and 403 (8:00—the "last known value"). This imputation method may include identifying and imputing a value that was populated at a most recent time period. For example, referring back to FIG. 3, instead of the value of 81.5 being imputed within the second record and temperature column for the table 302C, the value of 80 may be imputed, as it was the last known value—at 8:00, the temperature was 80 according to the first record of table 302C.

Figure 4B:
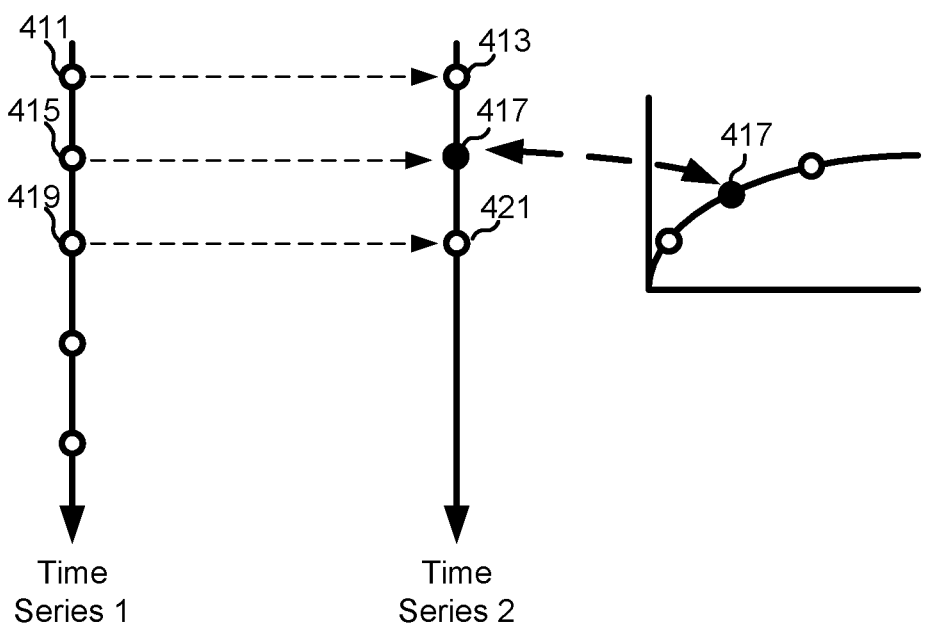
FIG. 4B is a time series diagram illustrating how data may be estimated and imputed, according to embodiments.

FIG. 4B is also a time series diagram illustrating how data may be estimated and imputed, according to embodiments. FIG. 4B illustrates that instead of imputing a value according to values already specified at a particular point in time (e.g., FIG. 4A), a separate value may be estimated and imputed based on various calculations. Time series 1 and time series 2 of FIG. 4B represent two different time series intervals. For example, points 411, 415, and 419 may represent timestamps populated in a data structure every 30 minutes, such as 8:00, 8:30, and 9:00. Points 413 and 421 initially represent data gathered a longer time period compared to time series 1, such as every hour (e.g., point 413=8:00; point 421=9:00). Point 417 may correspond to an imputed value at a time series point equal to point 415, such as 8:30.

Various algorithms may be utilized to impute values associated with point 417. For example, interpolation algorithms such as linear spline interpolation and/or cubic spline interpolation may be utilized. Linear interpolation uses a linear function for each data point. A spline is a polynomial between each pair of tabulated points (e.g., the temperature column values of table 302A in FIG. 3) given a tabulated function $f_k = f(x_k)$, k=0, ... N. In each interval $(x_k, x_{k+1})$, a straight line can be fit through the tabulated points $(x_k, f_k)$ and $(x_{k+1}, f_{k+1})$ using the interpolation formula:

$$f = Af_k + Bf_{k+1} \quad \text{Equation 1}$$

where $$A \equiv \frac{x_{k+1} - x}{x_{k+1} - x_k}, \quad \text{Equation 2}$$

$$B \equiv 1 - A = \frac{x - x_k}{x_{k+1} - x_k}.$$

Cubic spline interpolation produces an interpolated function that is continuous through to a second derivative. The derivatives may correspond to the rate of change between values (e.g., the temperature values in table 302A). In addition to the tabulated values of $f_j$, there are also tabulated values for the function's second derivatives (i.e., a set of numbers $f_j''$). Then within each interval $(x_k, x_{k+1})$, a cubic polynomial can be added to the right hand side of equation 1 whose second derivative varies linearly from a value $f_k''$ on the left to a value $f_{k+1}''$ on the right, which may make the continuous second derivative. Equation 1 may be replaced by:

$$f = Af_k + Bf_{k+1} + Cf_k'' + Df_{k+1}'' \quad \text{Equation 3}$$

where A and B are defined as in equation 1 and $$C \equiv \tfrac{1}{6}(A^3 - A)(x_{k+1} - x_k)^2, \quad D \equiv \tfrac{1}{6}(B^3 - B)(x_{k+1} - x_k)^2 \quad \text{Equation 4.}$$

The derivatives of equation 3 with respect to x may be taken using definition of A, B, C, and D to compute dA/dx, dB/dx, dC/dx, and d/D/dx. The result is:

$$\frac{df}{dx} = \quad \text{Equation 5}$$

$$\frac{f_{k+1} - f_k}{x_{k+1} - x_k} - \frac{3A^2 - 1}{6}(x_{k+1} - x_k)f_k'' + \frac{3B^2 - 1}{6}(x_{k+1} - x_k)f_{k+1}''$$

for the first derivative and
for the second derivative.

The required equations for cubic spline interpolation are obtained by setting equation 5 evaluated for $x = x_k$ in the interval $(x_{k-1}, x_k)$ equal to the same equation evaluated for $x = x_k$ but in the interval $(X_k, X_{k+1})$. This gives:

$$\frac{x_k - x_{k-1}}{6}f_{k-1}'' + \frac{x_{k+1} - x_{k-1}}{3}f_k'' + \frac{x_{k+1} - x_k}{6}f_{k+1}'' = \frac{f_{k+1} - f_k}{x_{k+1} - x_k} - \frac{f_k - f_{k-1}}{x_k - x_{k-1}}$$

$$\frac{d^2 f}{dx^2} = Af_k'' + Bf_{k+1}''$$

Accordingly, new value(s) associated with point 417 may be generated as an accurate prediction estimate of what the value associated with point 417 would have been had the data been measured at point 417 based on the time intervals of the time series and the actual data points through the equations explained above. Therefore, an imputation method may be specified such that at least one imputation function is applied to one or more time series data structures.

The estimations as explained above may include or instead be calculated by other methods. For example, instead of the last known value method being utilized as illustrated in FIG. 4A, other known values may be imputed, such as the next future value. Thus, as illustrated in FIG. 4A, instead of imputing the value associated with time point 403 for time point 405, a value may be imputed that is associated with time point 409. In some embodiments, an average or mean calculation between two or more points may be utilized to impute data. For example, referring back to FIG. 3, in order to determine what the fourth record of the temperature value should be in table 302C, an average between the 9:00 temperature value of 83 and 10:00 temperature value of 82 may be averaged, which is 82.5. Any other suitable methods may be utilized.

Figure 5:
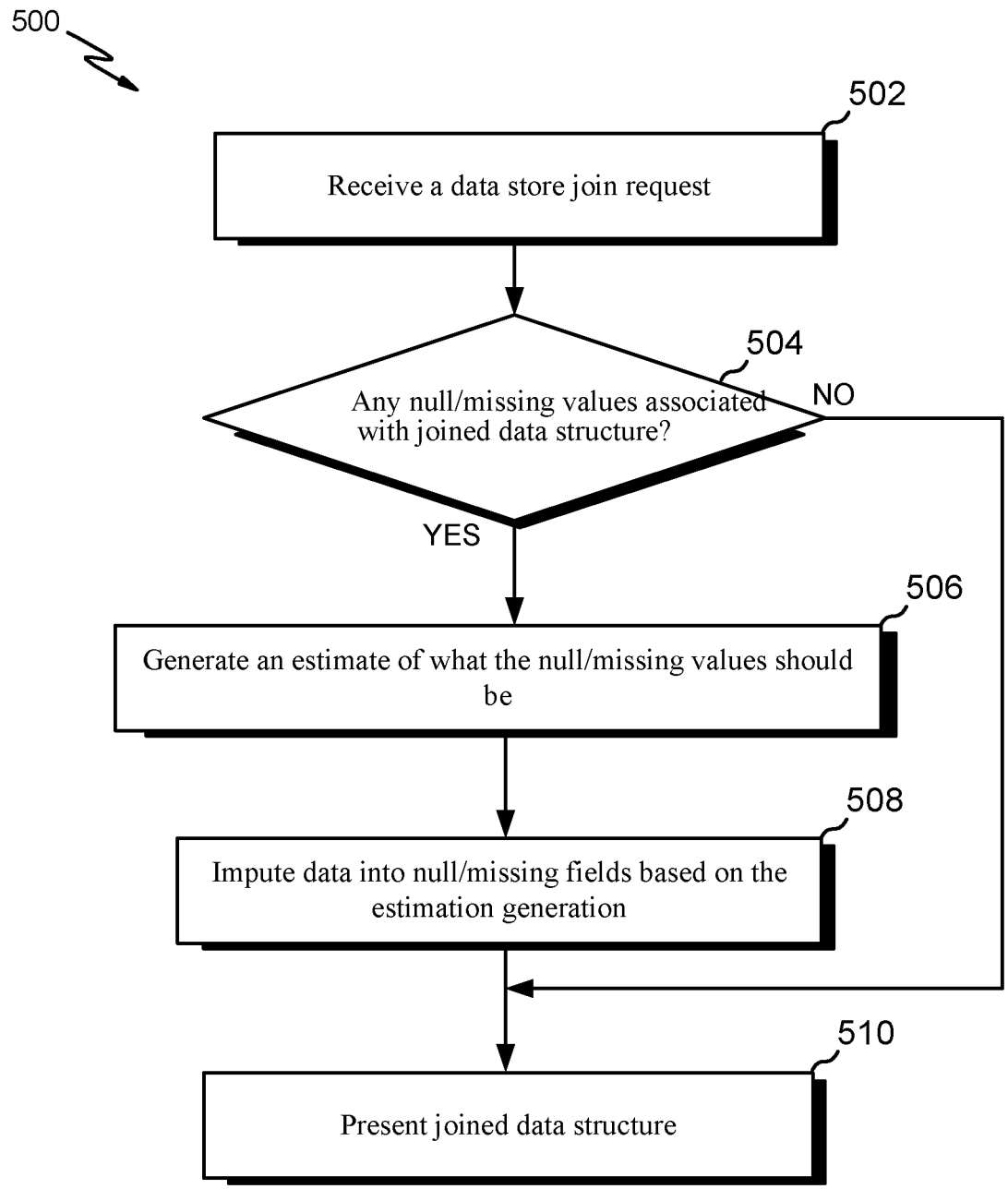
FIG. 5 is a flow diagram of an example process for imputing data as part of a join operation, according to embodiments.

FIG. 5 is a flow diagram of an example process 500 for imputing data as part of a join operation, according to embodiments. The process 500 begins at block 502 when a data store join request is received. For example, a user may issue a SQL join request query. Consistent with embodiments, any suitable type of join operation may be performed or requested, such as a left join, right join, inner join, full join, self join, non-equi-join, Cartesian join, nested-loop, explicit partitioning, explicit sorting, timestamp sorting, timestamp partitioning, sliding-window stream join, symmetric hash joins, double pipelined hash joins, hash merge join, and/or progressive merge join.

Per block 504, it may be determined (e.g., by the impute engine 126, 238) whether there are any null or missing values associated with joined data structure. If there are no null results, such as in an inner join request, then the process 500 may proceed to block 510 where the joined data structure is presented. If there are any null or missing values (e.g., the table 302B of FIG. 3), then according to block 506 an estimate may be generated (e.g., by the impute engine 126, 238) of what the null or missing values should be. The estimation at block 506 may correspond to a prediction of what value a null field would be had a sampling of data occurred at a particular time interval that was not originally specified in the data structure. The estimation value may be based on patterns and associations made with the rest of the data in the data structure. For example, interpolation algorithms and last-known-value methods may be utilized to predict these values as specified in FIGS. 4A and 4B above.

Per block 508, data may be imputed (e.g., by the impute engine 126, 238) into the null or missing fields based on the estimation generation that occurred at block 506. For example, based on making interpolation calculations, null SQL fields may be populated or imputed with the interpolation results.

Per block 510, the joined data structure may be presented. For example, referring back to FIG. 3, the left join table with a timestamp column, a stock price column, and a temperature column may be displayed to a computing device such that a user may view the joined data structure they requested.

FIG. 6 is a block diagram of a computing device 600 that includes a impute engine 626, according to embodiments. The components of the computing device 600 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The computing device 600 may include one or more general-purpose programmable central processing units (CPUs) 06A and 06B, herein generically referred to as the processor 06. In an embodiment, the computing device 600 may contain multiple processors; however, in another embodiment, the computing device 600 may alternatively be a single CPU device. Each processor 06 executes instructions stored in the memory 12 (e.g., the impute engine 626).

The computing device 600 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 600, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The storage devices 28 may be employed to store any of the databases described herein, including databases 110, 112, and 114. The I/O device interface 22 provides an interface to any of various other I/O devices or devices of other types, such as printers or fax machines. The network interface 24 provides one or more communication paths from the computing device 600 to other digital devices and computer systems.

Although the computing device 600 shown in FIG. 6 illustrates a particular bus structure providing a direct communication path among the processors 06, the memory 12, the bus interface 08, the display system 04, and the I/O bus interface unit 14, in alternative embodiments the computing device 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 600, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 600 is a multi-user mainframe computer system, a single-user system, or a server computer or similar device that has little or no direct user interface, but receives requests from other computer systems (clients). In other embodiments, the computing device 600 may be implemented as a desktop computer, portable computer, laptop or notebook computer, tablet computer, pocket computer, telephone, smart phone, or any other suitable type of electronic device. The computing device 600 may be any of the compute nodes 102, 104, and/or 106 of FIG. 1.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 600, and may also include the virtual memory of other computer systems coupled to the computing device 600 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data (e.g., the impute engine 626) shown in FIG. 6. These programs and data are illustrated in FIG. 6 as being included within the memory 12 in the computing device 600; however, in other embodiments, some or all of them may be on different computer systems and may be accessed remotely, e.g., via a network 30. The computing device 600 may use virtual addressing mechanisms that allow the programs of the computing device 600 to behave as if they only have access to a large, single storage entity instead of access to multiple, smaller storage entities. Thus, while the components and data shown in FIG. 6 are illustrated as being included within the memory 12, these components and data are not necessarily all completely contained in the same storage device at the same time. Although the components and data shown in FIG. 6 are illustrated as being separate entities, in other embodiments some of them, portions of some of them, or all of them may be packaged together.

In some embodiments, the memory 12 may include program instructions or modules, such as the impute engine 626. The impute engine 626 may be the impute engine 126 of FIG. 1 and/or the impute engine 238 of FIG. 2. In some embodiments, the impute engine 626 performs some or each of the functions as described in FIGS. 3, 4A, 4B, and/or 5.

In an embodiment, the components and data shown in FIG. 6 (e.g., the impute engine 626) may include instructions or statements that execute on the processor 06 or instructions or statements that are interpreted by instructions or statements that execute on the processor 06 to carry out the functions as described above. In another embodiment, the components shown in FIG. 6 may be implemented in hardware via semiconductor devices, chips, logical gates, circuits, circuit cards, and/or other physical hardware devices in lieu of, or in addition to, a processor-based system. In an embodiment, the components shown in FIG. 6 may include data in addition to instructions or statements.

FIG. 6 is intended to depict representative components of the computing device 600. Individual components, however, may have greater complexity than represented in FIG. 6. In FIG. 6, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 6 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for performing a join operation in a data store, the method comprising:

receiving a request to join one or more attributes of at least two independent sets of data into a data structure, the one or more attributes including a time attribute, the two independent sets of data being included within a data store;

determining that time data from a first set of data does not match to time data from a second set of data wherein the first set of data, the second set of data, and the data structure include a first table, a second table, and a third table, respectively;

generating a time value in the second set of data such that the time data from the second set of data matches the time data from the first set of data;

creating, in the second set of data and for a second attribute in the second set of data, a null field that corresponds to the generated time value;

receiving a first set of values, the first set of values being sampled at a first time series interval, wherein the first set of values are populated into the first table, and wherein the first time series interval includes a plurality of points in time that the first set of values were sampled;

receiving a second set of values, the second set of values being sampled at a second time series interval, wherein the second set of values are populated into the second table, and wherein the second time series interval includes a second plurality of points in time that the second set of values were sampled, wherein the first time series interval is not the same as the second time series interval;

wherein the request to join the one or more attributes is received subsequent to populating the first table and the second table;

wherein the request to join specifies equi-joining both the first set of values and the second set of values at the first time series interval where one or more results are null in the second table, wherein the one or more null results indicates that one or more values are missing;

determining that there are a plurality of null values for a plurality of fields in the second table;

generating, in response to the determining that there are the plurality of null values for the plurality of fields in the second table, a prediction estimate of what third set of values would be implemented in the plurality of fields for the plurality of null values had at least one of the third set of values been sampled at the first time series interval, wherein the prediction estimate includes utilizing a cubic spline interpolation estimation, the cubic spline interpolation estimation producing an interpolated function that is continuous through at least two derivatives;

imputing, in response to the generating of the prediction estimate, the third set of values into the plurality of fields, wherein there are no null values in the plurality of fields subsequent to the imputing; and displaying, in response to the imputing the third set of values into the plurality of fields, the third table;

wherein the third table includes the first set of values under a first column, the second set of values under a second column, the third set of values under the second column, and the first time series interval;

wherein the join request includes instructions to use an attribute-based joining technique; and wherein the populating is based on the attribute-based joining technique.

2. The method of claim 1, wherein the generating the prediction estimate includes utilizing a next future value.

3. The method of claim 2, further comprising generating, prior to the populating and in response to the determining, the prediction estimate of what value would be represented by the calculated value.

4. The method of claim 3, wherein the generating the prediction estimate includes identifying a value that was populated at a most recent time period and using the identified value as the prediction estimate.

5. The method of claim 1, wherein the data store is a relational database, and wherein the one or more attributes include a first column of a first table and a second column of a second table, and wherein the data structure is third table.

6. The method of claim 1, wherein the request to join one or more attributes includes a Structured Query Language (SQL) query to perform one join operation from a group of join operations consisting of: a left join, a right join, inner join, full join, and self join.

7. A system for performing a join operation in a data store, the system comprising:
a computing device having a processor and a memory; and
a computer readable storage medium having program instructions embodied therewith, the program instructions executable by the processor to cause the system to perform a method, the method comprising:
receiving a first set of values, the first set of values being sampled at a first time series interval, wherein the first set of values are populated into a first data structure;
receiving a second set of values, the second set of values being sampled at a second time series interval, wherein the second set of values are populated into a second data structure, and wherein the first time series interval is not the same as the second time series interval;
receiving a join request to join one or more attributes of the first data structure and one or more attributes of the second data structure, the request including combining the one or more attributes of the second data structure with the first time series interval;
generating a time value in the second set of data such that the time data from the second set of data matches the time data from the first set of data;
creating, in the second set of data and for a second attribute in the second set of data, a null field that corresponds to the generated time value;
generating, in response to the creating, a prediction estimate of what value would be represented by the null field had the one or more attributes of the second data structure been sampled at the first time interval, wherein the prediction estimate includes utilizing a cubic spline interpolation estimation, the cubic spline interpolation estimation producing an interpolated function that is continuous through at least two derivatives, wherein the cubic spline interpolation estimation is governed by the following equations:

$$f = Af_k + Bf_{k+1} + Cf_k'' + Df_{k+1}'';$$

$$A \equiv \frac{x_{k+1} - x}{x_{k+1} - x_k};$$

$$B \equiv 1 - A = \frac{x - x_k}{x_{k+1} - x_k};$$

$$C \equiv \frac{1}{6}(A^3 - A)(x_{k+1} - x_k)^2;$$

$$D \equiv \frac{1}{6}(B^3 - B)(x_{k+1} - x_k)^2;$$

$$\frac{df}{dx} = \frac{f_{k+1} - f_k}{x_{k+1} - x_k} - \frac{3A^2 - 1}{6}(x_{k+1} - x_k)f_k'' + \frac{3B^2 - 1}{6}(x_{k+1} - x_k)f_{k+1}'';$$

$$\frac{x_k - x_{k-1}}{6}f_{k-1}'' + \frac{x_{k+1} - x_{k-1}}{3}f_k'' + \frac{x_{k+1} - x_k}{6}f_{k+1}'' = \frac{f_{k+1} - f_k}{x_{k+1} - x_k} - \frac{f_k - f_{k-1}}{x_k - x_{k-1}};$$

and $$\frac{d^2f}{dx^2} = Af_k'' + Bf_{k+1}'';$$

and populating, in response to the generating the prediction estimate, the prediction estimate into the null field;

wherein the join request includes instructions to use and attribute-based joining technique; and wherein the populating is based on the attribute-based joining technique.

8. The system of claim 7, the method further comprising populating, in response to the generating the prediction estimate, the prediction estimate into the null field corresponding to the time value.

9. The system of claim 8, wherein the generating the prediction estimate includes identifying a value that was populated at a most recent time period and using the identified value as the prediction estimate.

10. The system of claim 7, wherein the data store is a graph database, and wherein the one or more attributes include a first attribute of a first graph node and a second attribute of a second graph node, wherein the first data structure is third graph node, and the second data structure is a fourth graph node.

11. The system of claim 7, wherein the request to join one or more attributes includes a Structured Query Language (SQL) query to perform one join operation from a group of join operations consisting of: a left join, a right join, inner join, full join, and self join.

12. The system of claim 7, wherein the generating the prediction estimate includes calculating a mean value between two values of the second set of values that are sampled at the second time series interval.

13. A computer program product for performing a join operation in a data store, the computer program product comprising a computer readable storage medium having program code embodied therewith, the program code comprising computer readable program code configured to perform a method, the method comprising:
receiving a first stream of tuples to be processed by a plurality of processing elements operating on one or more computer processors, each processing element of the plurality of processing elements having one or more stream operators, the plurality of processing elements forming an operator graph in which the first stream of tuples flow between the one or more stream operators, the operator graph defining one or more execution paths for processing and routing the first stream of tuples, the each processing element having an associated memory space;
receiving a second stream of tuples;
receiving a request to join the first stream with the second stream, the first stream being sampled at a first time series interval, the second stream being sampled at a second time series interval, wherein the first time series interval is not the same as the second time series interval;
determining the first time series interval does not match the second time series interval;
generating a time value in the second stream such that the time interval from the second stream matches the time interval from the first stream;
creating, in the second stream and for a second attribute in the second stream, a null field that corresponds to the generated the time value;
generating, in response to the creating, a prediction estimate of what value would be represented in the null field had the first stream been sampled at the second time series interval,. the prediction estimate includes utilizing a cubic spline interpolation estimation, the cubic spline interpolation estimation producing an interpolated function that is continuous through at least two derivatives, wherein the cubic spline interpolation estimation is governed by the following equations:

$$f = Af_k + Bf_{k+1} + Cf_k'' + Df_{k+1}'';$$

$$A \equiv \frac{x_{k+1} - x}{x_{k+1} - x_k};$$

$$B \equiv 1 - A = \frac{x - x_k}{x_{k+1} - x_k};$$

$$C \equiv \frac{1}{6}(A^3 - A)(x_{k+1} - x_k)^2;$$

$$D \equiv \frac{1}{6}(B^3 - B)(x_{k+1} - x_k)^2;$$

$$\frac{df}{dx} = \frac{f_{k+1} - f_k}{x_{k+1} - x_k} = \frac{3A^2 - 1}{6}(x_{k+1} - x_k)f_k'' + \frac{3B^2 - 1}{6}(x_{k+1} - x_k)f_{k+1}'';$$

$$\frac{x_k - x_{k-1}}{6}f_{k-1}'' + \frac{x_{k+1} - x_{k-1}}{3}f_k'' + \frac{x_{k+1} - x_k}{6}f_{k+1}'' = \frac{f_{k+1} - f_k}{x_{k+1} - x_k} - \frac{f_k - f_{k-1}}{x_k - x_{k-1}};$$

and $$\frac{d^2f}{dx^2} = Af_k'' + Bf_{k+1}'';$$

and
populating, in response to the generating the prediction estimate, the prediction estimate into the null field;
wherein the join request includes instructions to use and attribute-based joining technique; and
wherein the populating is based on the attribute-based joining technique.

14. The computer program product of claim 13, the method further comprising populating, in response to the generating the prediction estimate, the prediction estimate into the null field.

15. The computer program product of claim 14, wherein the generating the prediction estimate includes identifying a value that was populated at a most recent time period and using the identified value as the prediction estimate.

16. The computer program product of claim 13, wherein the generating the prediction estimate includes calculating a median value between two values of the second stream that are sampled at the second time series interval.

17. The computer program product of claim 13, wherein the request to join the first stream with the second stream includes a query to perform one join operation from a group of join operations consisting of: a count-based join, an attribute-based join, and window-based join.

* * * * *